US012661620B2

(12) United States Patent
Anson

(10) Patent No.: US 12,661,620 B2
(45) Date of Patent: Jun. 23, 2026

(54) PORTABLE DISPLAY APPARATUS FOR BEVERAGE AERATION

(71) Applicant: Jonathan Ross Anson, Simi Valley, CA (US)

(72) Inventor: Jonathan Ross Anson, Simi Valley, CA (US)

( * ) Notice: Subject to any disclaimer, the term of this patent is extended or adjusted under 35 U.S.C. 154(b) by 371 days.

(21) Appl. No.: 18/443,121

(22) Filed: Feb. 15, 2024

(65) Prior Publication Data

US 2024/0269624 A1 Aug. 15, 2024

Related U.S. Application Data

(60) Provisional application No. 63/485,185, filed on Feb. 15, 2023.

(51) Int. Cl.

| | |
|---|---|
| ***B01F 23/2361*** | (2022.01) |
| ***B01F 23/23*** | (2022.01) |
| ***B01F 23/237*** | (2022.01) |
| ***B01F 31/86*** | (2022.01) |
| ***G09F 9/33*** | (2006.01) |
| *B01F 101/16* | (2022.01) |

(52) U.S. Cl.

CPC .. *B01F 23/2361* (2022.01); *B01F 23/237611* (2022.01); *B01F 23/238* (2022.01); *B01F 31/86* (2022.01); *G09F 9/33* (2013.01); *B01F 2101/16* (2022.01)

(58) Field of Classification Search

CPC ........ A47G 19/2227; A47G 2019/2238; B01F 23/2361; B01F 23/238; B01F 23/237611; B01F 31/86; B01F 2101/16; B01F 2101/17; G09F 9/33

USPC .......................................................... 261/120

See application file for complete search history.

(56) References Cited

U.S. PATENT DOCUMENTS

| | | | | |
|---|---|---|---|---|
| 11,511,240 | B2 | 11/2022 | Anson | |
| 2018/0304209 | A1 * | 10/2018 | Hellmers | B01F 25/54 |

* cited by examiner

*Primary Examiner* — Charles S Bushey

(57) ABSTRACT

A portable display apparatus for beverage aeration includes a floating compartment, an aerating system, a battery, a chipset, a visual display system, and a power button. The floating compartment includes a first half and a second half as the first half and the second half are hermetically connected to each other. The aerating system includes a pump, at least one inlet port, and a plurality of outlet ports. The pump is mounted within the floating compartment. The inlet port is integrated into the first half. The plurality of outlet ports is integrated into the first half and the second half. The inlet port is in fluid communication with the plurality of outlet ports through the pump. The battery and the chipset are mounted within the floating compartment. The visual display system is mounted onto the floating compartment.

12 Claims, 16 Drawing Sheets

PORTABLE DISPLAY APPARATUS FOR BEVERAGE AERATION

The current application claims a priority to the U.S. provisional patent application Ser. No. 63/485,185 filed on Feb. 15, 2023.

FIELD OF THE INVENTION

The present invention relates generally to an apparatus for fluid aeration. More specifically, the present invention is a portable display apparatus for beverage aeration that is configured to effortlessly drop into glassware of all sizes for beverage decanting entertainment purposes.

BACKGROUND OF THE INVENTION

Wine ranks highly among the oldest fermented beverages to be made available for human consumption. By allowing the natural sugars in grapes to ferment over time, the sugars feed bacteria which produce alcohol, giving different fruit-based wines their distinctive tastes. Over thousands of years, wine processing and development has evolved and become quite streamlined. Most of today's wines are factory-made and mass-produced, thus allowing access to a wider range of consumers. Over that time, methods for enhancing the wine drinking experience have been developed and discovered. Wine tastings are increasingly popular and allow users to enjoy different wines one sip at a time. Connoisseurs recognize other properties of the wine as well, including the color, viscosity, interactions with light, and more. Such wine enthusiasts also often swirl the wine within the wine glass to release and enjoy fragrant undertones.

However, the untrained eye and nose may not appreciate or even be aware of such properties within their wine. Most occasional wine-drinkers get enjoyment from sipping away at a glass over dinner, never realizing the full potential of the stored beverage they are consuming. The act of swirling wine within a glass may be seen as snooty, leaving people to swirl as an ironic or mocking gesture. Further, untrained eyes divide wine into categories of red or white, never appreciating the effort required to create the visual characteristics of the wine. As such, wine in a glass seems to be a boring affair. What is needed is a tool which helps to release the various scents contained within a glass of wine. Further desirable is a device which attracts the eye of a casual wine consumer.

It is an objective of the present invention to address the aforementioned issues. More specifically, the present invention is a portable and drop-in beverage aeration and display apparatus that can create a dazzling display of flowing wine, bubbles, lights, vibrations, and/or fog within any flask, decanter, or glass. A pump system of the present invention can provide a constant flow of air into the bottom of a wine glass, thus allowing that air to flow up through the wine and gather smells and scents contained within. The bubbles may be controlled to flow at different rhythms or rates to provide an interesting visual pattern for the user to observe. The pump system can also eject a flow of wine at various angles and pressures, thus providing a dazzling wine show within the wine glass. The present invention is equipped with lights and sensors to further provide visual and physical stimulus to the user and to allow for synchronization of wine movement with music or sounds.

DETAILED DESCRIPTION OF THE INVENTION

Figure 1:
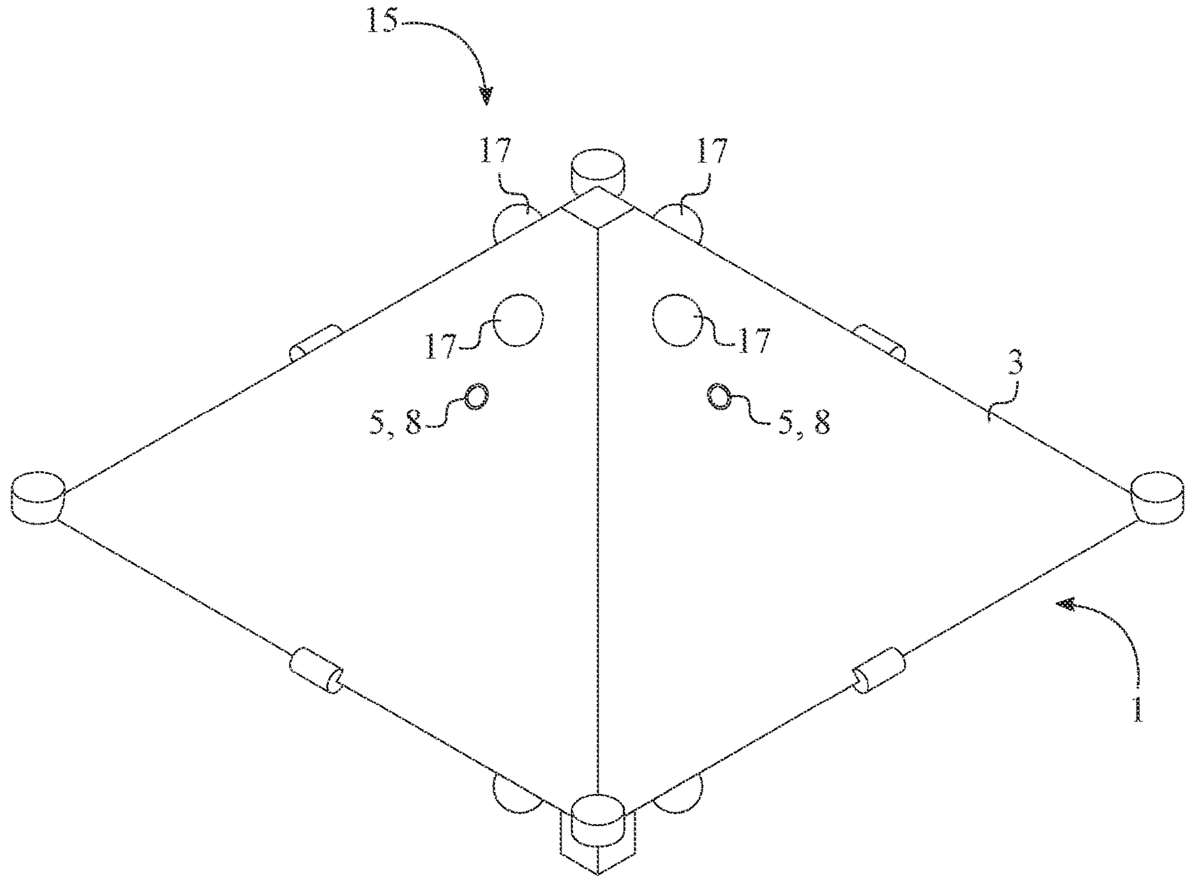
FIG. 1 is a top perspective view of the present invention.

All illustrations of the drawings are for the purpose of describing selected versions of the present invention and are not intended to limit the scope of the present invention.

The present invention is a portable display apparatus for beverage aeration that can be placed within a quantity of beverage, preferably wine. The present invention enhances the overall visual appeal of the quantity of beverage through lighting effects. The present invention is also configured to improve the overall scent and taste of the quantity of beverage by mixing with air, which stimulates the release of various fragrant tones contained within the quantity of beverage. The quantity of beverage can be stored within a receptacle, a decanter, a wine glass, or any other transparent container. As shown in FIGS. 1-5 and FIG. 8, the present invention comprises a floating compartment 1, an aerating system 5, a battery 9, a chipset 10, a visual display system 15, and a power button 11.

In reference to the general configuration of the present invention, as shown in FIGS. 1-8 and FIGS. 12-16, the floating compartment 1 functions as the main structural body that can float within the quantity of beverage. The floating compartment 1 comprises a first half 2 and a second half 3, wherein the first half 2 and the second half 3 are hermetically connected to each other. The aerating system 5 introduces air into the quantity of beverage and comprises a pump 6, at least one inlet port 7, and a plurality of outlet ports 8. More specifically, the pump 6 is mounted within the floating compartment 1 so that the pump 6 is able to introduce air bubbles into the quantity of beverage or circulate the quantity of beverage through the floating compartment 1. The inlet port 7 is integrated into the first half 2 and functions as an entry channel for the quantity of beverage or air. The plurality of outlet ports 8 is integrated into the first half 2 and the second half 3 so that the plurality of outlet ports 8 is able to discharge multiple beverage streams into the surrounding air or multiple air streams into the quantity of beverage. In order to complete the circulation process, the inlet port 7 is in fluid communication with the plurality of outlet ports 8 through the pump 6. The battery 9 being mounted within the floating compartment 1 so that electrical energy can be supplied to corresponding components. The chipset 10 is mounted within the floating compartment 1 so that the user can customize and control the corresponding components. The visual display system 15 is mounted onto the floating compartment 1 as the visual display system 15 is configured to emit the lighting effects. Furthermore, the pump 6, the chipset 10, and the visual display system 15 are electrically connected to the battery 9 through the power button 11. As a result, the user can easily turn-on and turn-off the present invention as the power button 11 is integrated into the floating compartment 1. Furthermore, the pump 6 and the visual display system 15 are electronically connected to the chipset 10 so that the present invention can be intelligently controlled via software algorithms to autonomously react to musical effects, surrounding sounds, mobile applications, and a short-range wireless data exchanging unit 22.

Figure 2:
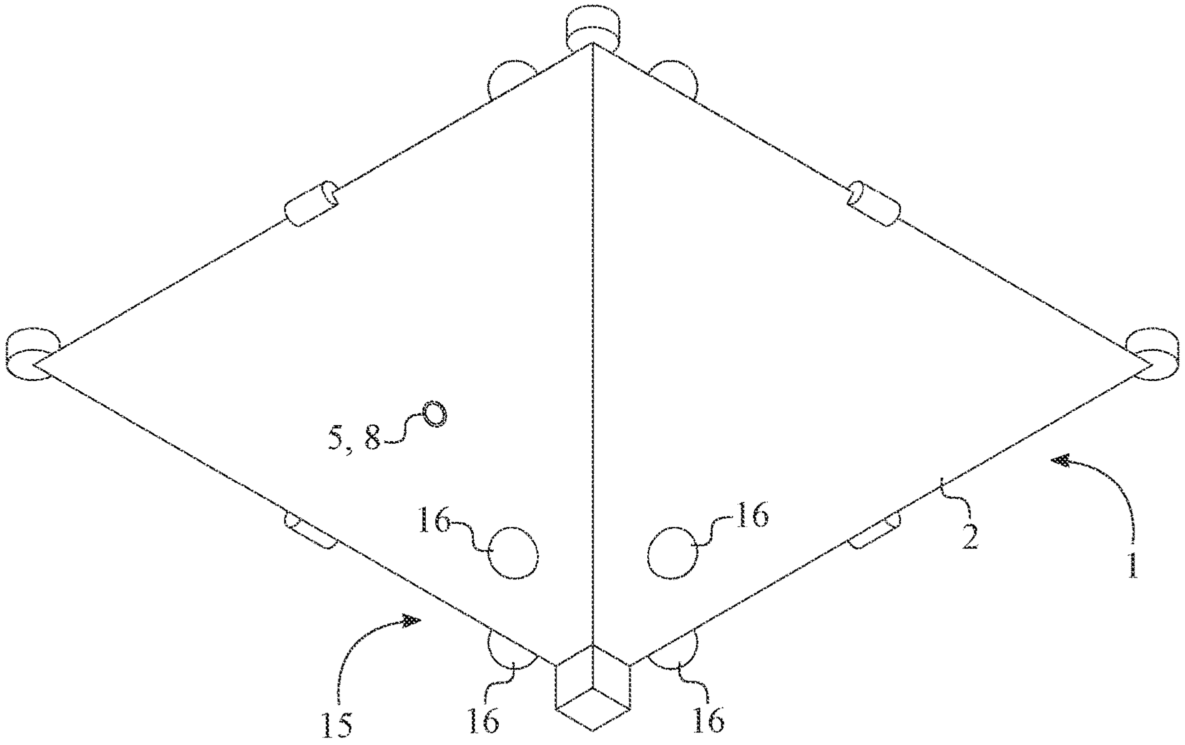
FIG. 2 is a bottom perspective view of the present invention.
Figure 3:
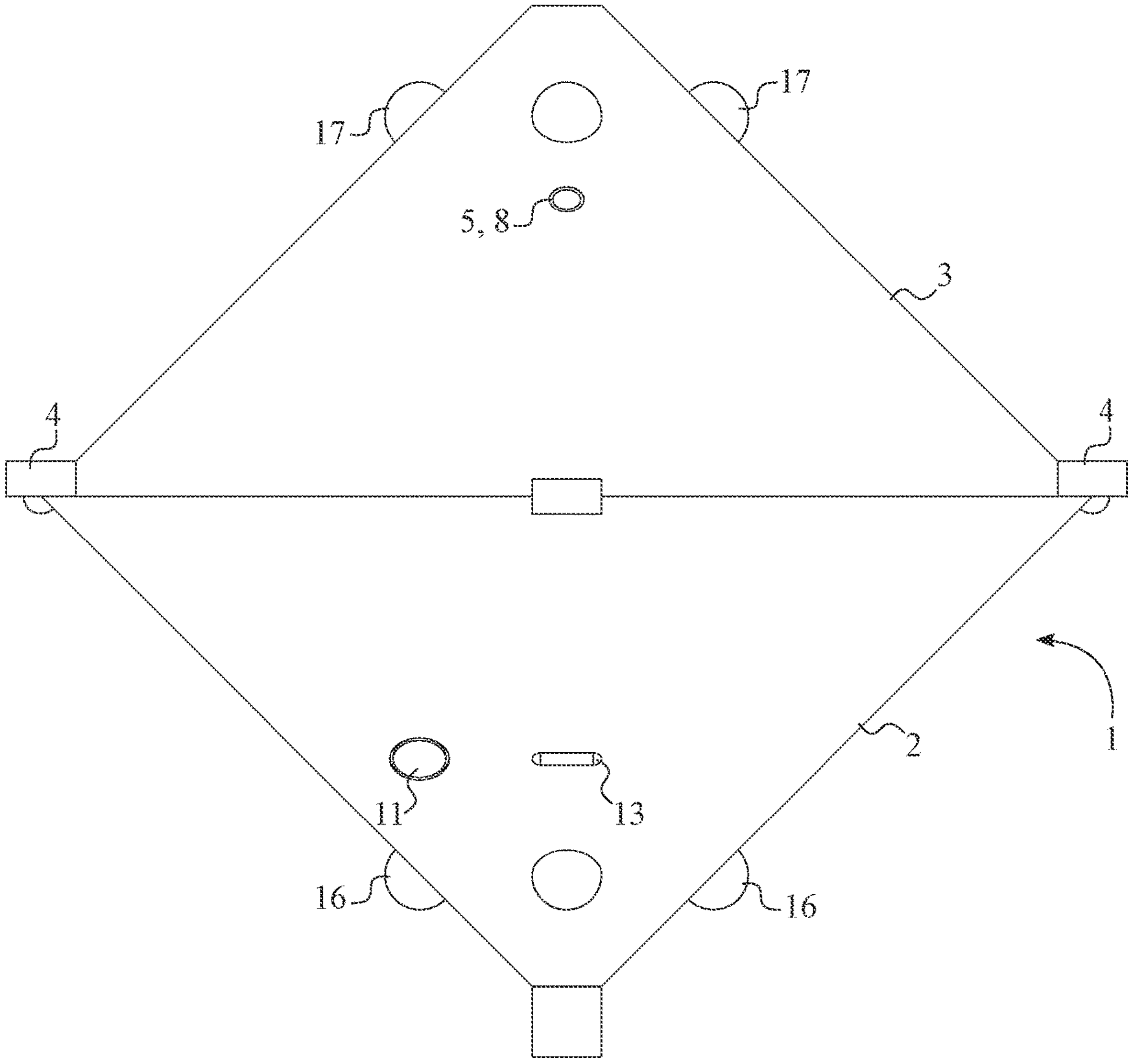
FIG. 3 is a front view of the present invention.
Figure 4:
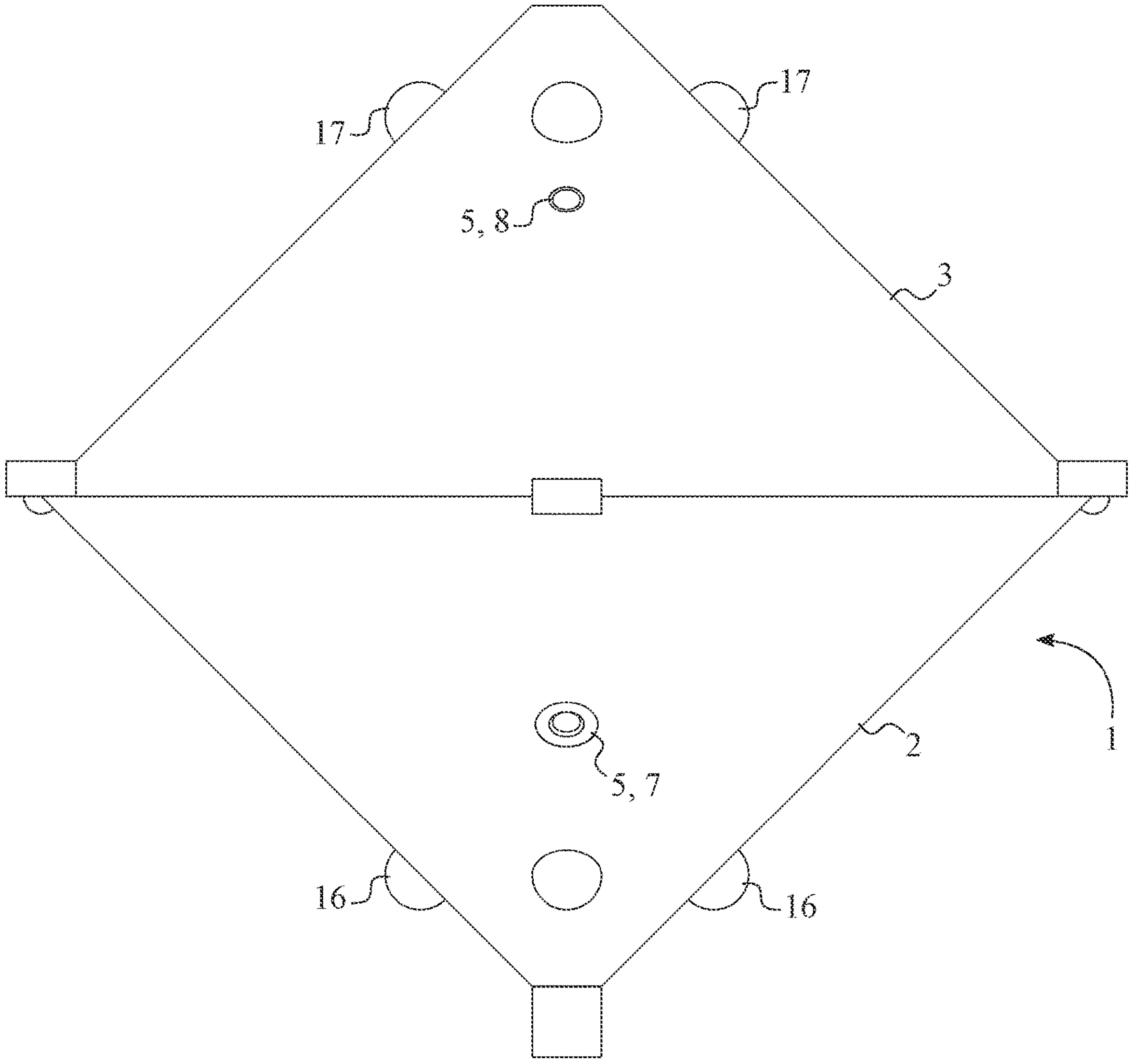
FIG. 4 is a side view of the present invention.

In reference to FIGS. 1-3, the floating compartment 1 is preferably shaped into an octahedron shape for producing optical effects and buoyancy for floatation within the quantity of beverage. However, the floating compartment 1 is not limited to the octahedron shape and can be cubical, spherical, or any other related geometric shapes. In addition, materials of the floating compartment 1 can provide light reflection, light scatter, or blending of light for special optical effects. Due to the hermetic connection between the first half 2 and the second half 3, internally positioned components of the present invention can be protected from the quantity of beverage. Furthermore, the first half 2 and the second half 3 provide a surface area to mount and position components of the present invention. Even though the present invention is explained in relation to a single aerating system 5, it is understood that the present invention can be configured with multiple aerating systems 5 without deviating from the scope of the functionality.

Figure 8:
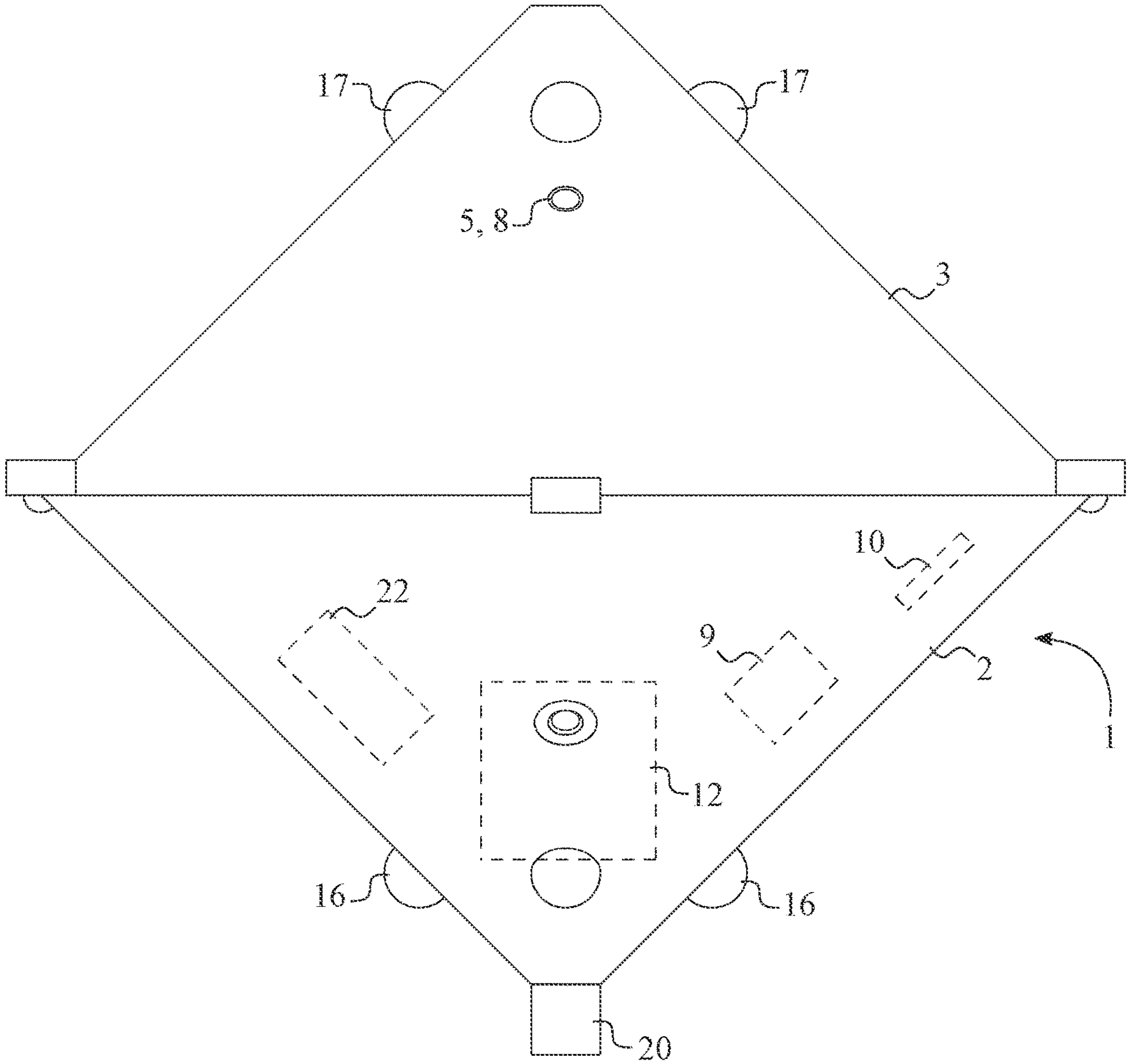
FIG. 8 is a side view of the present invention showing the vibration motor, the chipset, the battery, and the short-range wireless data exchanging unit.
Figure 13:
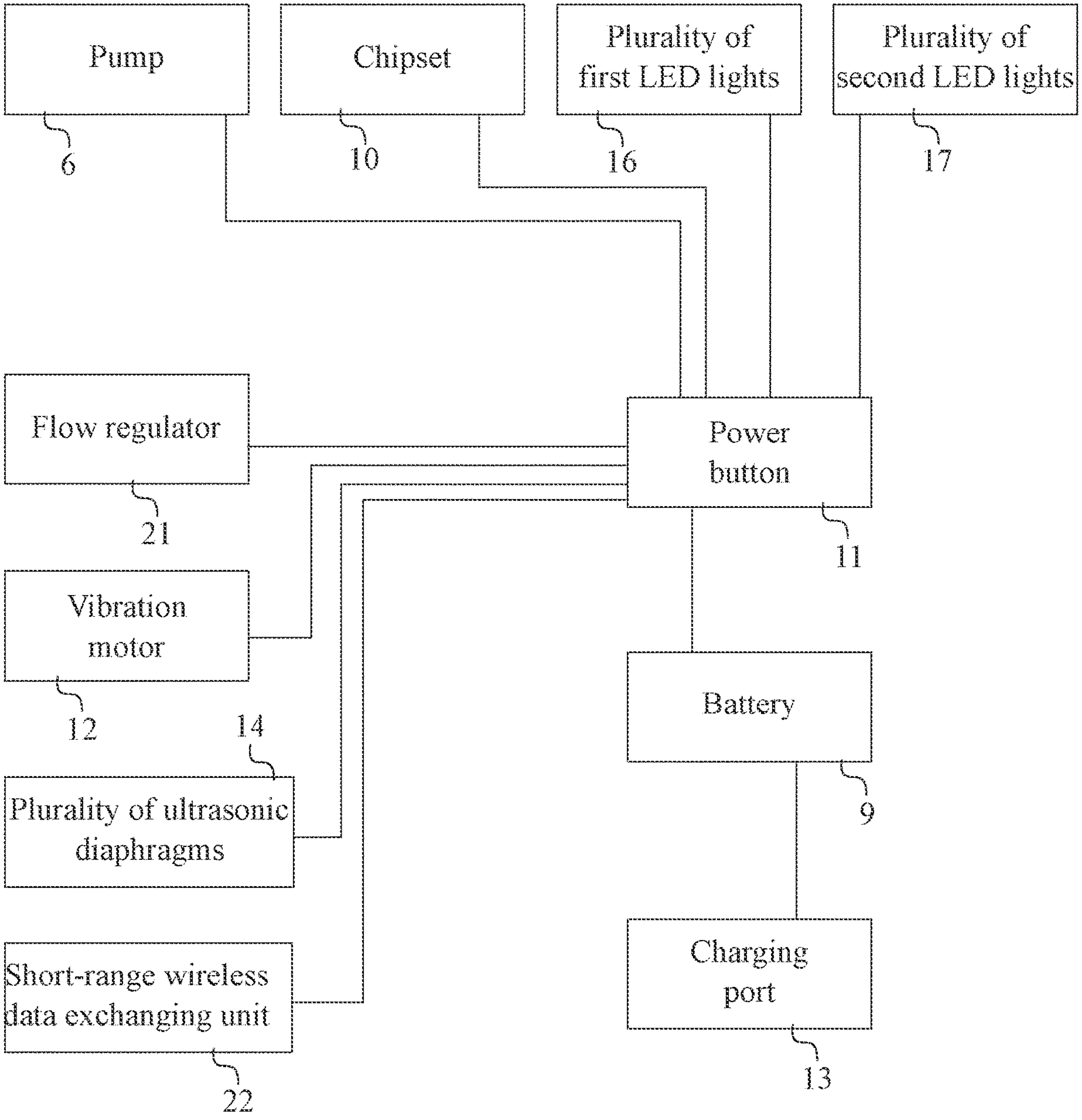
FIG. 13 is a schematic view showing the electrical connections of the present invention, wherein the visual display system includes the plurality of first LED lights and the plurality of second LED lights.
Figure 14:
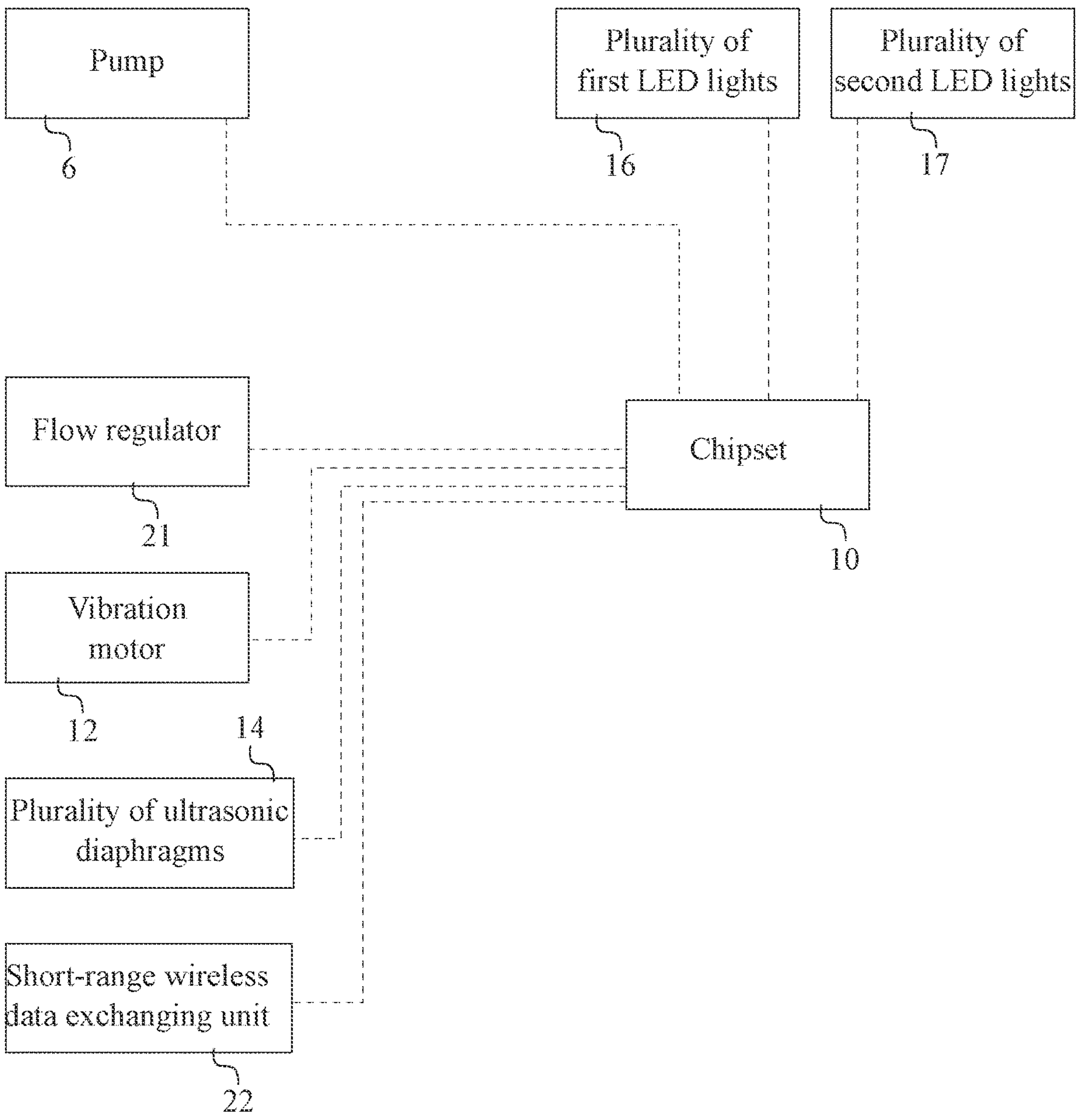
FIG. 14 is a schematic view showing the electronic connections of the present invention, wherein the visual display system includes the plurality of first LED lights and the plurality of second LED lights.
Figure 15:
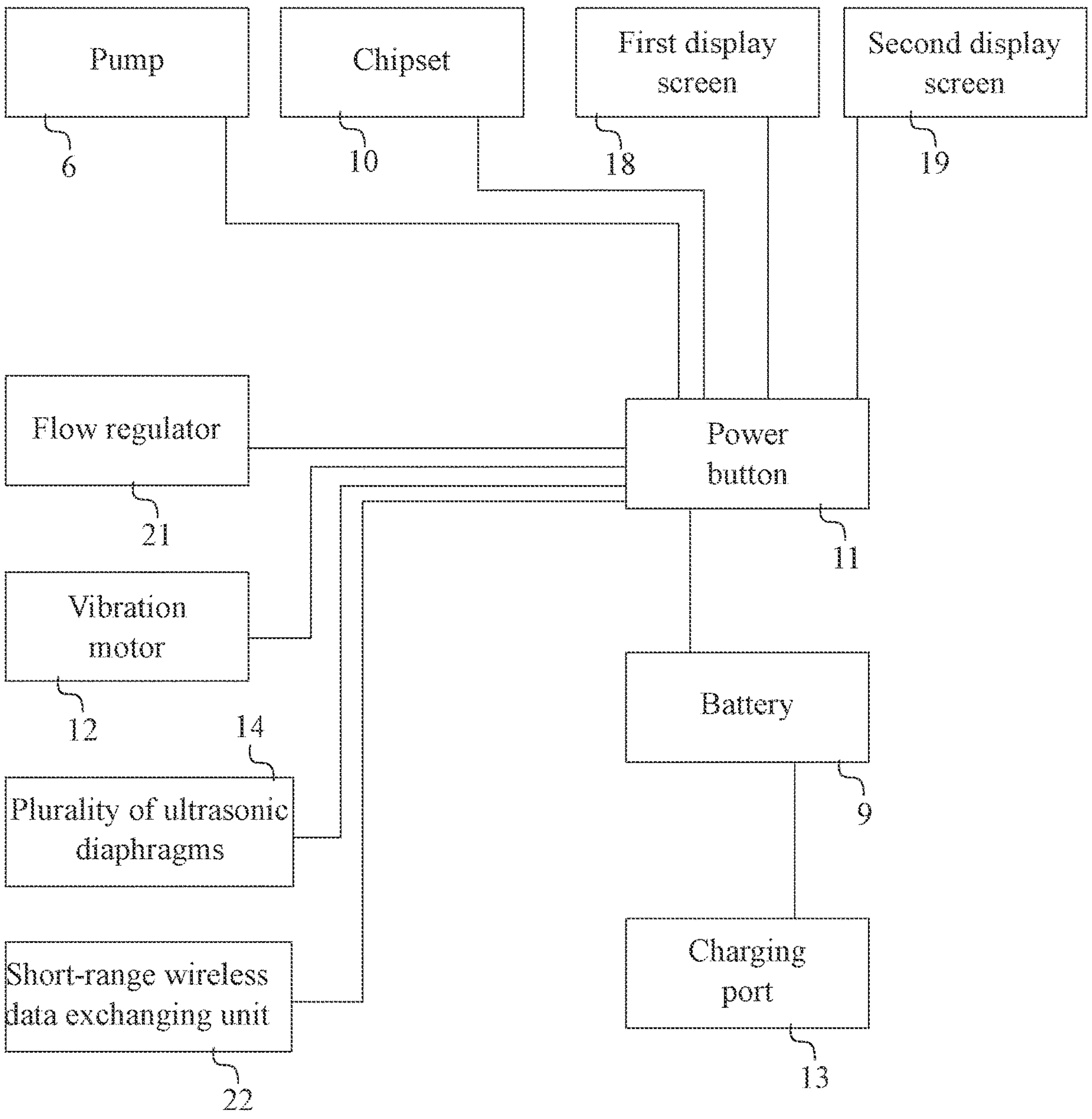
FIG. 15 is a schematic view showing the electrical connections of the present invention, wherein the visual display system includes the first display screen and the second display screen.
Figure 16:
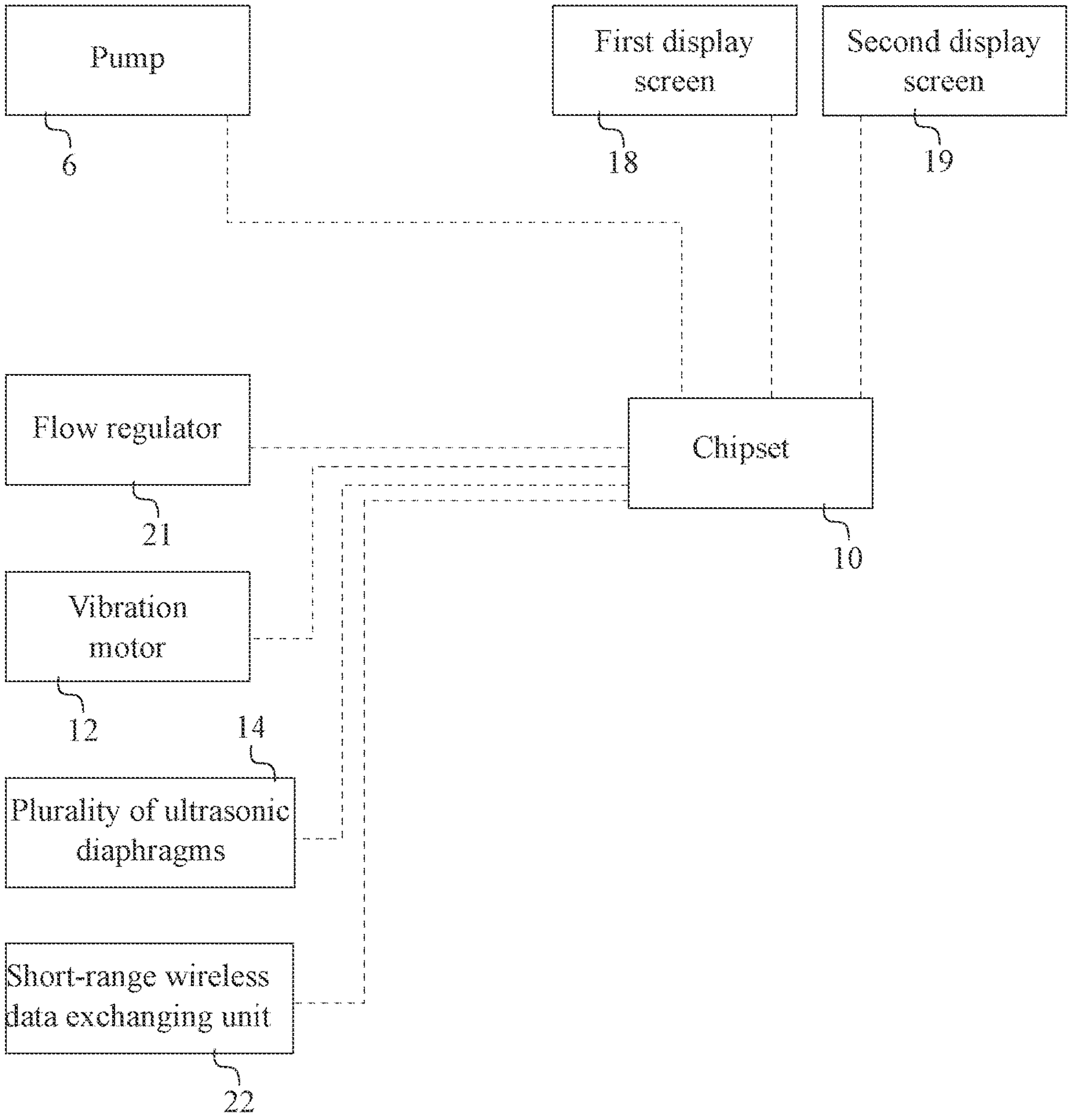
FIG. 16 is a schematic view showing the electronic connections of the present invention, wherein the visual display system includes the first display screen and the second display screen.

In reference to FIG. 8, FIG. 13, and FIG. 14, the present invention may further comprise a vibration motor 12. The vibration motor 12 is mounted within the floating compartment 1 and electrically connected to the battery 9 through the power button 11. As a result, the vibration motor 12 is able to vibrate the floating compartment 1 within the quantity of beverage thus transferring the vibration energy of the floating compartment 1 into the corresponding beverage container. For example, when the present invention is utilized within a wine glass, the user's lips can be stimulated and massaged as they sip their drink due to the vibration of the present invention. The vibration motor 12 is electronically connected to the chipset 10 thus allowing the user to control and customize the operation of the vibration motor 12 via a mobile application. In addition, the vibration motor 12 can support the ability of the floating compartment 1 to spin in various directions in conjunction with the synchronous projection of the beverage laminar flows.

In reference to FIG. 3, FIG. 13, and FIG. 14, the present invention may further comprise a charging port 13 so that the battery 9 can be recharged. Preferably, a rechargeable battery-pack is utilized as the battery 9 so that the user can easily recharge the battery 9 via the charging port 13. More specifically, the charging port 13 is externally integrated into the floating compartment 1 and electrically connected to the battery 9 so that the user can easily access the charging port 13 to plug-in an external power source.

In reference to FIG. 6, FIG. 7, FIG. 13, and FIG. 14, the present invention may further comprise a plurality of ultrasonic diaphragms 14 so that a foggy environment can be created with rapid condensation. The plurality of ultrasonic diaphragms 14 is radially connected around the floating compartment 1. The plurality of ultrasonic diaphragms 14 is electrically connected to the battery 9 through the power button 11 and electronically connected to chipset 10. More specifically, when the plurality of ultrasonic diaphragms 14 is electrically powered through the battery 9, the generated vibration of the plurality of ultrasonic diaphragms 14 is able to propel beverage droplets into the air. Once in the air, the beverage droplets evaporate and create a foggy environment above the quantity of beverage thus enhancing the visual appearance. Furthermore, the user can control and customize the operation of the plurality of ultrasonic diaphragms 14 via a mobile application.

The present invention is able to draw the user's attention to the quantity of beverage through lighting effects of the visual display system 15. As shown in FIG. 1 and FIG. 2, the visual display system 15 is externally integrated into the first half 2 and the second half 3 thus providing the maximum coverage.

In reference to some embodiments of the present invention, the visual display system 15 comprises a plurality of first light-emitting diode (LED) lights 16 and a plurality of second LED lights 17, as shown in FIG. 1, FIG. 2, FIG. 13, and FIG. 14. More specifically, the plurality of first LED lights 16 is externally integrated into the first half 2 so that the plurality of first LED lights 16 can illuminate the surrounding area of the first half 2. Similarly, the plurality of second LED lights 17 is externally integrated into the second half 3 so that the surrounding area of the second half 3 can be illuminated. The plurality of first LED lights 16 and the plurality of second LED lights 17 are electrically connected to the battery 9 through the power button 11 as the battery 9 provides the necessary electrical power. The plurality of first LED lights 16 and the plurality of second LED lights 17 are electronically connected to the chipset 10 thus allowing the user to control and customize the illumination of the visual display system 15. The present invention is not limited to the plurality of first LED lights 16 and the plurality of second LED lights 17 and can be equipped with other mechanisms to emit various wavelengths of energy for special effects purposes.

In reference to some embodiments of the present invention, the visual display system 15 comprises a first display screen 18 and a second display screen 19, as shown in FIG. 10, FIG. 11, FIG. 15, and FIG. 16. More specifically, the first display screen 18 is externally and perimetrically integrated into the first half 2 so that first display screen 18 can illuminate the surrounding area of the first half 2 or display specific images such as fire. Similarly, the second display screen 19 is externally and perimetrically integrated into the second half 3 so that the second display screen 19 can illuminate the surrounding area of the second half 3 or display specific images as mentioned before. The first display screen 18 and the second display screen 19 are electrically connected to the battery 9 through the power button 11 as the battery 9 provides the necessary electrical power. The first display screen 18 and the second display screen 19 are electronically connected to the chipset 10 thus allowing the user to control and customize the illumination of the visual display system 15.

Figure 6:
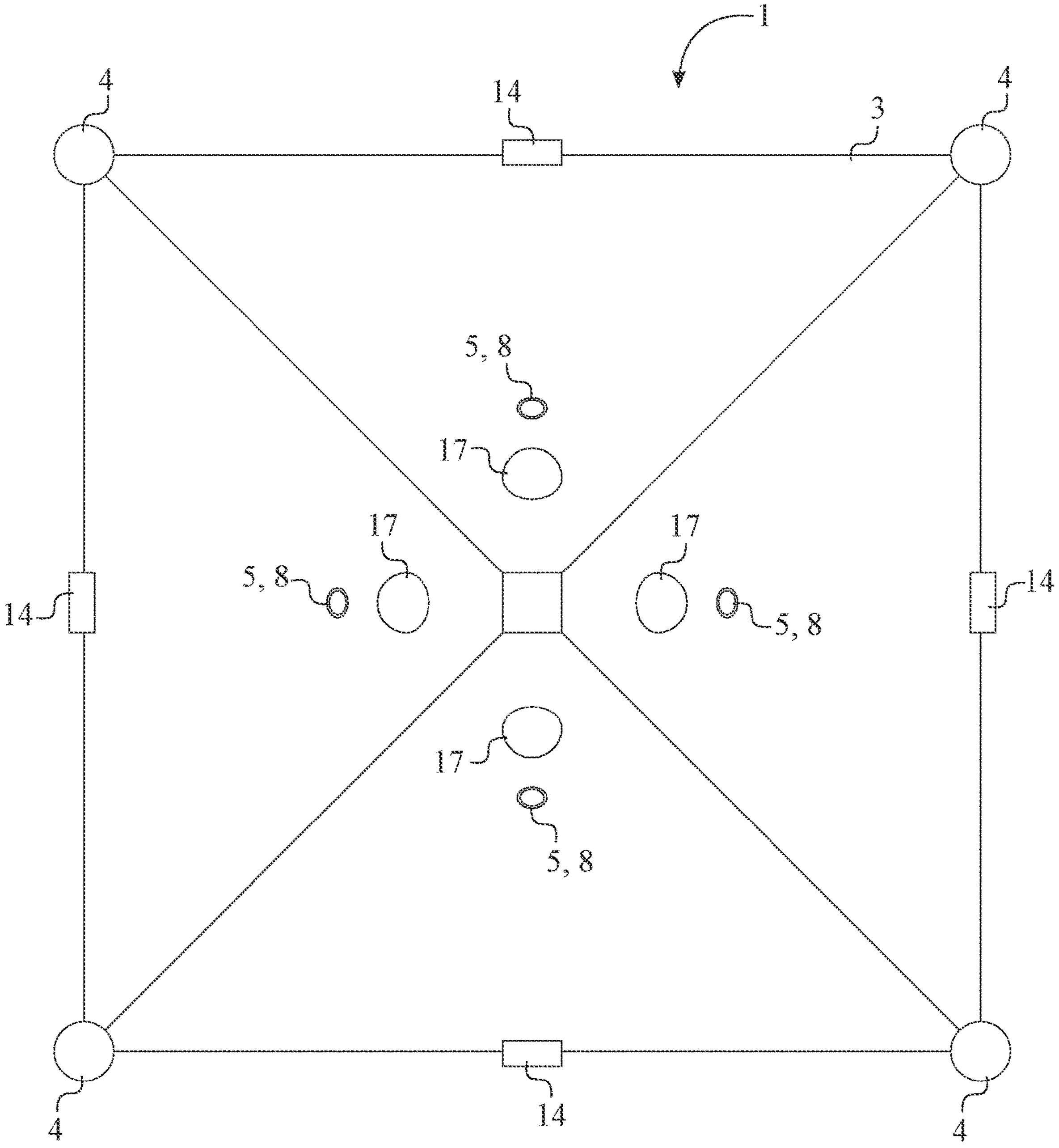
FIG. 6 is a top view of the present invention.
Figure 7:
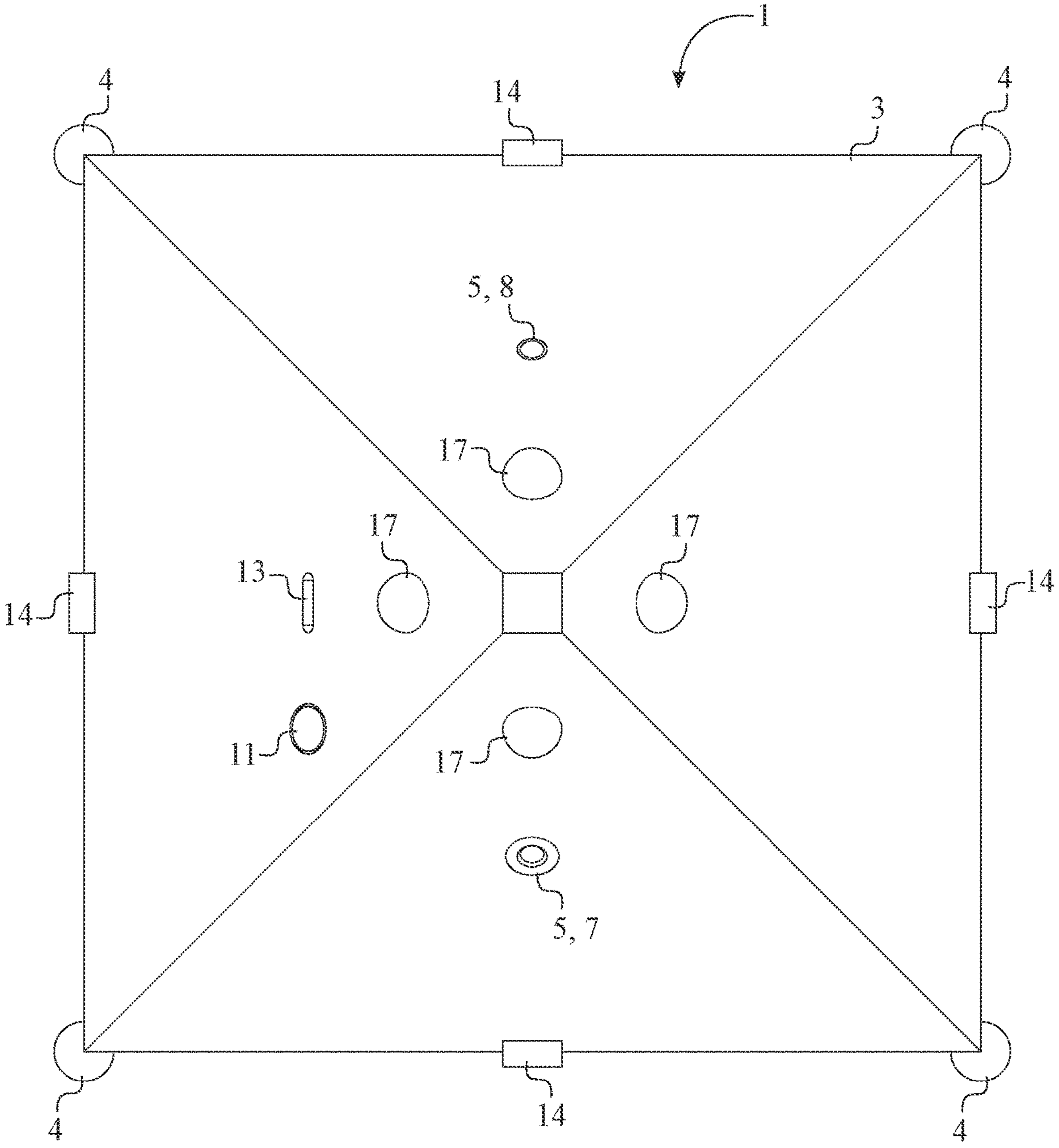
FIG. 7 is a bottom view of the present invention.

In reference to FIG. 3, FIG. 6, and FIG. 7, the present invention may further comprise a plurality of floatation bodies 4. The plurality of floatation bodies 4 is radially connected around the floating compartment 1 and adjacently positioned to the first half 2 and the second half 3. More specifically, the plurality of floatation bodies 4 functions as secondary floating units to provide additional buoyancy to the floating compartment 1. In other words, when the buoyancy of the floating compartment 1 changes with respect to the weight of the internal or external components of the present invention, the plurality of floatation bodies 4 is able to compensate the additional weight to provide optimal positioning of the present invention with the quantity of beverage.

Figure 5:
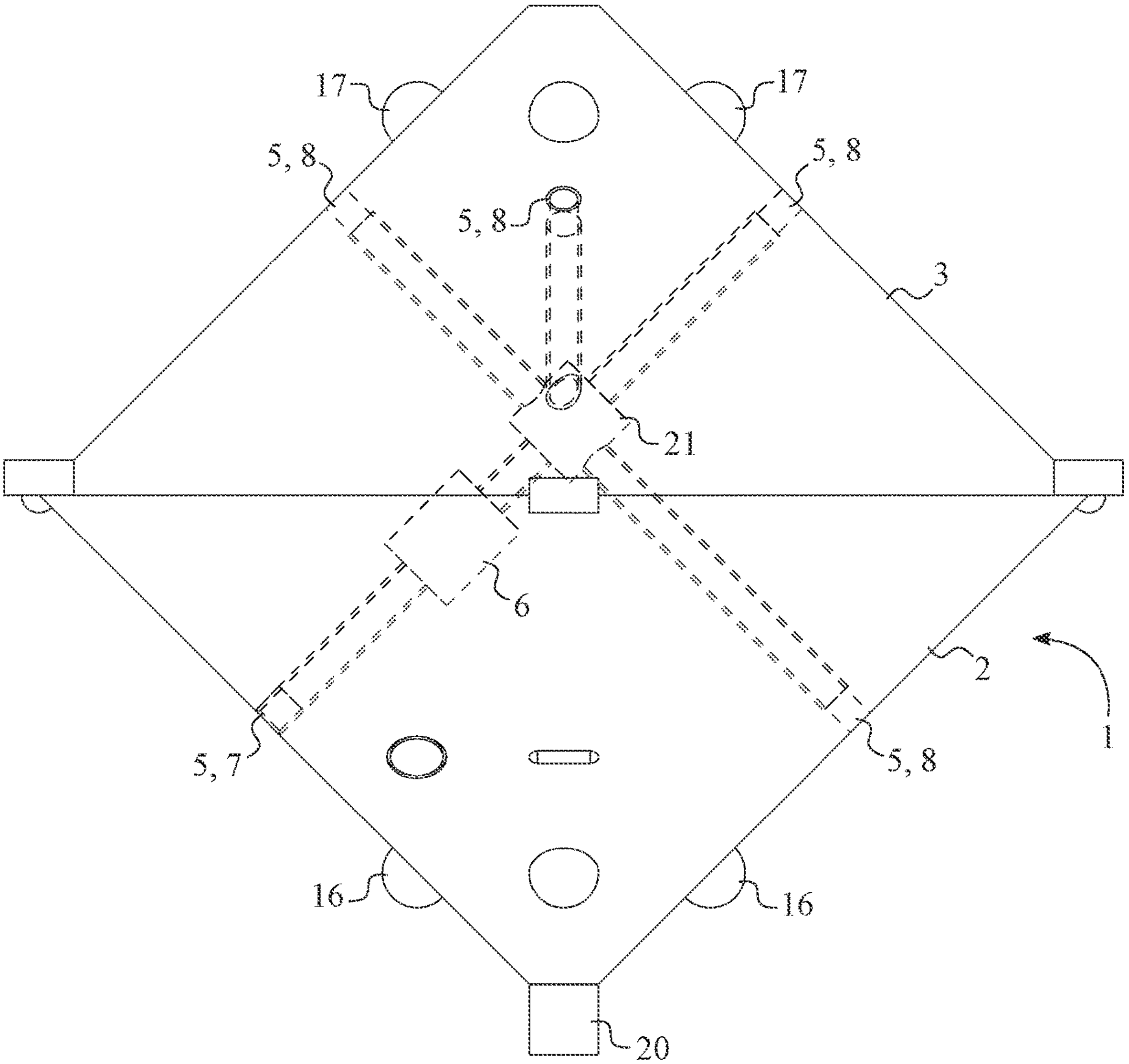
FIG. 5 is a front view of the present invention, wherein the floating compartment is oriented at the fountain configuration and showing the internally positioned components of the aerating system.
Figure 9:
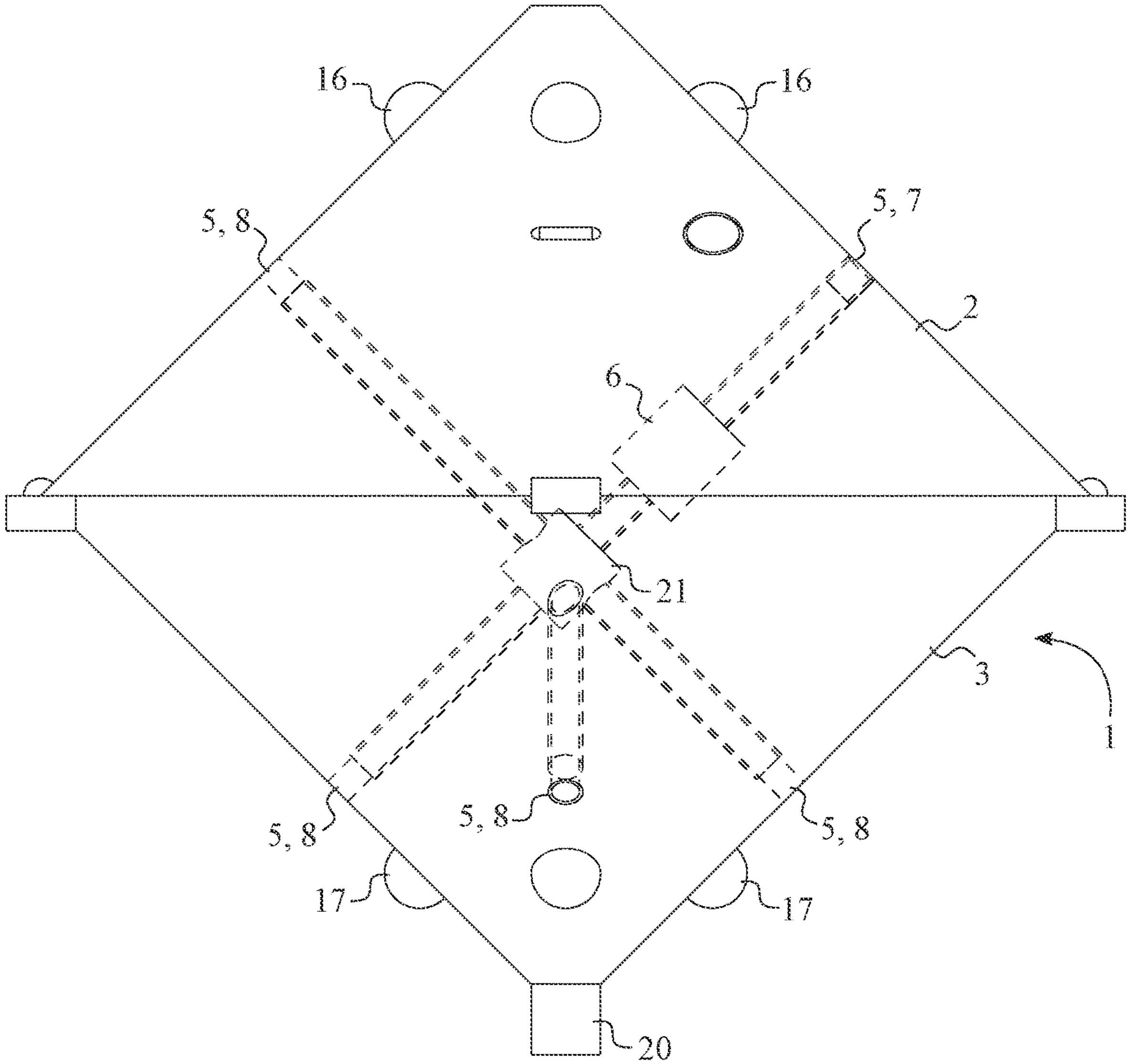
FIG. 9 is a front view of the present invention, wherein the floating compartment is oriented at the aeration configuration and showing the internally positioned components of the aerating system.
Figure 10:
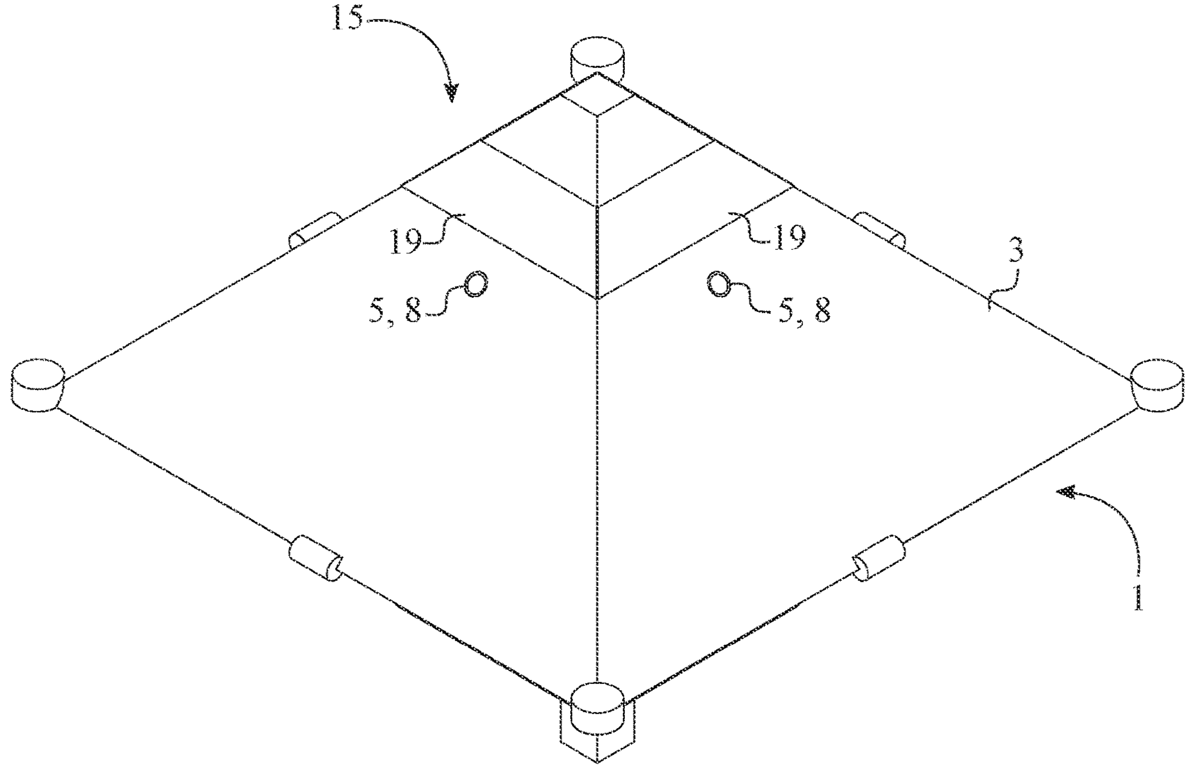
FIG. 10 is a top perspective view of the present invention showing the second display screen.
Figure 11:
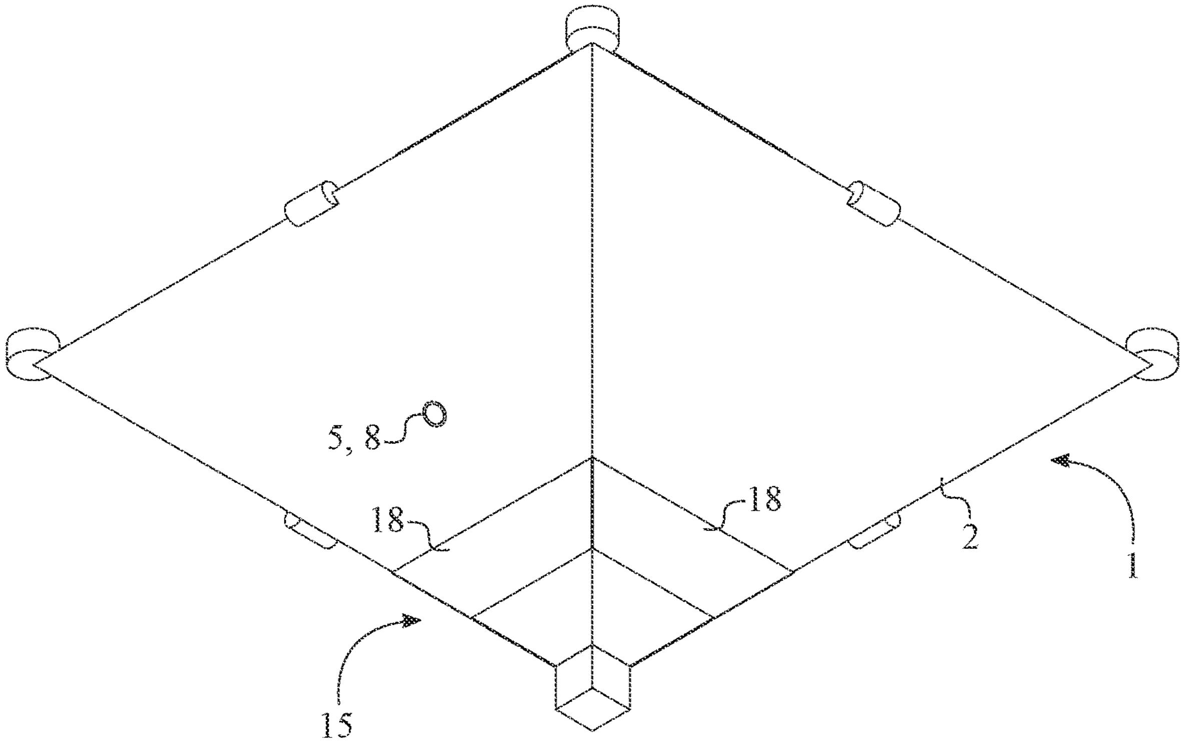
FIG. 11 is a bottom perspective view of the present invention showing the first display screen.
Figure 12:
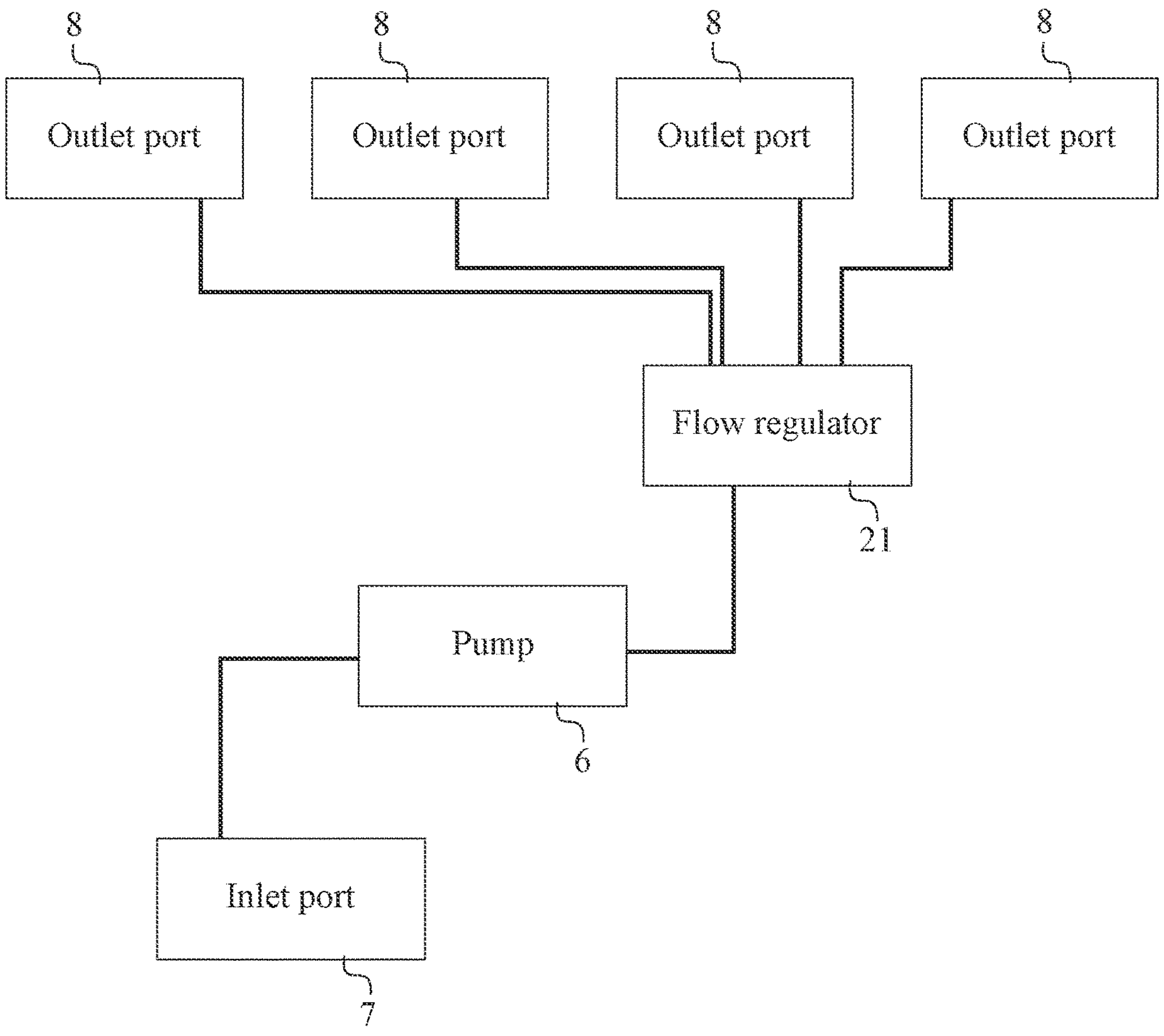
FIG. 12 is a schematic view showing the fluid connection of the present invention.

In reference to FIG. 5 and FIG. 9, the present invention may further comprise an anchor 20 so the orientation of the floating compartment 1 can be controlled. More specifically, the anchor 20 is removably mounted to the first half 2 or the second half 3 of the floating compartment 1. When the anchor 20 is removably mounted to the first half 2, the present invention is oriented at a fountain configuration as the inlet port 7 is positioned adjacent to the anchor 20. When the anchor 20 is removably mounted to the second half 3, the present invention is oriented at an aeration configuration as the inlet port 7 is positioned offset from the anchor 20.

In reference to the fountain configuration, as shown in FIG. 5, the floating compartment 1 projects laminar flow of beverage into the air so that the beverage is able to mix with the surrounding air. Preferably, a larger glassware such as a flask or decanter is utilized in the fountain configuration to accommodate the projection of the beverage. More specifically, the first half 2 is submerged within the quantity of beverage due to the weight of the anchor 20 that is removably mounted to the first half 2. Resultantly, the second half 3 is oriented or floated above the quantity of beverage. The pump 6 functions as a fluid-control mechanism, thereby ensuring the circulation of the quantity of beverage. For example, when the pump 6 is operational, the inlet port 7 draws a stream of beverage into the pump 6 so that the stream of beverage can be discharged through the plurality of outlet ports 8. Depending upon the exact positioning of the plurality of the outlet ports 8, the functionality of each of the plurality of outlet ports 8 can differ within the fountain configuration. The chipset 10 further allow for pattern control and modification of the flow rate in order to enable customizable control over the appearance of the fountain configuration via a mobile application.

In reference to a preferred embodiment of the present invention, as shown in FIG. 5, the plurality of outlet ports 8 comprises a plurality of second outlets and at least one first outlet. More specifically, the plurality of second outlets is integrated into the second half 3 and positioned atop the quantity of beverage. The first outlet is integrated into the first half 2 and positioned within the quantity of beverage. The stream of beverage that is discharged from the pump 6 then exits from the plurality of second outlets and the first outlet. When the stream of beverage exits through the plurality of second outlets, the stream of beverage is propelled into the air as a beverage fountain so that the beverage is able to mix with the surrounding air. When the stream of beverage exits through the first outlet, the stream of beverage is ejected back into the quantity of beverage thus creating the necessary force to spin or move the floating compartment 1 within the beverage container. In reference to some embodiments of the present invention, the plurality of outlet ports 8 comprises the plurality of second outlets as the plurality of second outlets only generates the beverage fountain without any spin or movement of the floating compartment 1. In reference to some embodiments of the present invention, the plurality of outlet ports 8 comprises the at least one first outlet as the first outlet only spins or moves the floating compartment 1 within the beverage container without the beverage fountain.

In reference to the aeration configuration, as shown in FIG. 9, the floating compartment 1 draws a flow of air into the quantity of beverage so that the surrounding air can be mixed in the beverage with a bubbling-effect. More specifically, the second half 3 is submerged within the quantity of beverage due to the weight of the anchor 20 that is removably mounted to the second half 3. Resultantly, the first half 2 is oriented or floated above the quantity of beverage. The pump 6 functions as an air-control mechanism, thereby ensuring the circulation of the flow of air into the quantity of beverage. For example, when the pump 6 is operational, the inlet port 7 draws the flow of air into the pump 6 so that the flow of air can be discharged through the plurality of outlet ports 8. Depending upon the exact positioning of the plurality of the outlet ports 8, the functionality of each of the plurality of outlet ports 8 can differ within the aeration configuration. The chipset 10 further allow for pattern control and modification of the flow rate in order to enable customizable control over the appearance of the aeration configuration via a mobile application.

In reference to the preferred embodiment of the present invention, as shown in FIG. 5, the flow of air that is discharged from the pump 6 then exits from the plurality of second outlets and the first outlet. When the flow of air exits through the plurality of second outlets, the flow of air is ejected into the quantity of beverage as a stream of bubbles so that the surrounding air is able to mix with the quantity of beverage. Furthermore, the stream of bubbles also move or spin the floating compartment 1 with the beverage container. When the flow of air exits through the first outlet, the flow of air is discharged back into the surrounding air thus generating air movement within the beverage container. Furthermore, the flow of air can also be controlled via closure of the first outlet with a flexible, rubberlike cap or seal for efficient transfer of the flow of air to the plurality of second outlets to attain the maximum beverage aeration. In reference to some embodiments of the present invention, the plurality of outlet ports 8 comprises the plurality of second outlets as the plurality of second outlets only generates the bubbling-effect without discharging the flow of air back into the surrounding air.

In reference to FIG. 5, FIG. 13, and FIG. 14, the present invention may further comprise a flow-regulator 21 so that the user is able to adjust the flow-rate of the plurality of outlet ports 8. More specifically, the pump 6 is in fluid communication with the flow-regulator 21 as the inlet port 7 is in fluid communication with the pump 6. Then, the flow-regulator 21 is able to be in fluid communication with the plurality of outlet ports 8. The flow-regulator 21 being electrically connected to the battery 9 through the power button 11 so that the user is able to electrically operate the flow-regulator 21. The flow-regulator 21 is electronically connected to chipset 10 thus allowing the user to control and customize the operation of the flow-regulator 21 via a mobile application. For example, the flow-regulator 21 allows the user to open or close one or more ports from the plurality of outlet ports 8 so that a preferred outlook can be attained within the fountain configuration or the aeration configuration.

In reference to FIG. 8, FIG. 13, and FIG. 14, the present invention may further comprise a short-range wireless data exchanging unit 22 so that the chipset 10 is able to communicate with a mobile application. More specifically, the short-range wireless data exchanging unit 22 is mounted within the floating compartment 1 to protect from the quantity of beverage. The short-range wireless data exchanging unit 22 is electrically connected to the battery 9 through the power button 11 and electronically connected to the chipset 10 thus enabling the operation of the short-range wireless data exchanging unit 22.

Furthermore, artificial intelligence can be introduced to the present invention through communication with a handheld computerized device such as a smartphone and the chipset 10. The handheld computerized device can serve to intelligently process outside sound stimulation and subsequently transmit data commands to the chipset 10 through the short-range wireless data exchanging unit 22, allowing the present invention to display a reactive beverage fountain, bubbling-effect, output via the visual display system 15, outlet via the vibration motor 12, and an output via the plurality of ultrasonic diaphragms 14.

Furthermore, the bubble generation of the aeration configuration can be further enhanced via adaptations of porous material in line with the flow of air, such as air stone or ceramic contraptions. In-line material in contact with the flow of the beverage can also be adapted to remove unwanted chemicals, such as histamines or sulfites to enhance the flavor or reduce allergens. The materials of the floating compartment 1 can be used for other purposes as well, such as the chilling of the beverage. In addition, the floating compartment 1 materials can also be utilized for digital display purposes on the present invention itself. The geometry of the internal flow cavities as well as the material structures used to project flow can vary in their design. For example, a large and porous mesh may cover the internal cavities to modulate the flow of the beverage in conjunction with the pump system for varying projections and display purposes. The internal system may not be limited to one pump as well. In addition, the vibration motor internal to the system may be connected to a miniaturized, motorized turntable system to modulate flow. Finally, the system may also be further enhanced with the integration of wireless charging capability to easily recharge the battery 9.

Although the invention has been explained in relation to its preferred embodiment, it is to be understood that many other possible modifications and variations can be made without departing from the spirit and scope of the invention as hereinafter claimed.

What is claimed is:

1. A portable display apparatus for beverage aeration comprising:

a floating compartment;
an aerating system;
a battery;
a chipset;
a visual display system;
a power button;
the floating compartment comprising a first half and a second half;
the aerating system comprising a pump, at least one inlet port, and a plurality of outlet ports;
the first half and the second half being hermetically connected to each other;
the pump being mounted within the floating compartment;
the inlet port being integrated into the first half;
the plurality of outlet ports being integrated into the first half and the second half;
the inlet port being in fluid communication with the plurality of outlet ports through the pump;
the battery being mounted within the floating compartment;
the chipset being mounted within the floating compartment;
the visual display system being mounted onto the floating compartment;
the power button being integrated into the floating compartment;
the pump, the chipset, and the visual display system being electrically connected to the battery through the power button; and
the pump and the visual display system being electronically connected to the chipset.

2. The portable display apparatus for beverage aeration as claimed in claim 1 comprising:

a vibration motor;
the vibration motor being mounted within the floating compartment;
the vibration motor being electrically connected to the battery through the power button; and
the vibration motor being electronically connected to the chipset.

3. The portable display apparatus for beverage aeration as claimed in claim 1 comprising:

a charging port;
the charging port being integrated into the floating compartment; and
the charging port being electrically connected to the battery.

4. The portable display apparatus for beverage aeration as claimed in claim 1 comprising:

a plurality of ultrasonic diaphragms;
the plurality of ultrasonic diaphragms being radially connected around the floating compartment;
the plurality of ultrasonic diaphragms being electrically connected to the battery through the power button; and
the plurality of ultrasonic diaphragms being electronically connected to chipset.

5. The portable display apparatus for beverage aeration as claimed in claim 1 comprising:

the visual display system comprising a plurality of first light-emitting diode (LED) lights and a plurality of second LED lights;
the plurality of first LED lights being externally integrated into the first half;
the plurality of second LED lights being externally integrated into the second half;
the plurality of first LED lights and the plurality of second LED lights being electrically connected to the battery through the power button; and
the plurality of first LED lights and the plurality of second LED lights being electronically connected to the chipset.

6. The portable display apparatus for beverage aeration as claimed in claim 1 comprising:

the visual display system comprising a first display screen and a second display screen;

the first display screen being externally integrated into the first half;

the second display screen being externally integrated into the second half;

the first display screen and the second display screen being electrically connected to the battery through the power button; and the first display screen and the second display screen being electronically connected to the chipset.

7. The portable display apparatus for beverage aeration as claimed in claim 1 comprising:

a plurality of floatation bodies;

the plurality of floatation bodies being radially connected around the floating compartment; and the plurality of floatation bodies adjacently positioned to the first half and the second half.

8. The portable display apparatus for beverage aeration as claimed in claim 1 comprising:

an anchor; and the anchor being removably mounted to the floating compartment.

9. The portable display apparatus for beverage aeration as claimed in claim 8 comprising:

a fountain configuration;

the anchor being removably mounted to the first half; and the inlet port being positioned adjacent to the anchor.

10. The portable display apparatus for beverage aeration as claimed in claim 8 comprising:

an aeration configuration;

the anchor being removably mounted to the second half; and the inlet port being positioned offset from the anchor.

11. The portable display apparatus for beverage aeration as claimed in claim 1 comprising:

a flow-regulator;

the inlet port being in fluid communication with the pump;

the pump being in fluid communication with the flow-regulator;

the flow-regulator being in fluid communication with the plurality of outlet ports;

the flow-regulator being electrically connected to the battery through the power button; and the flow-regulator being electronically connected to chipset.

12. The portable display apparatus for beverage aeration as claimed in claim 1 comprising:

a short-range wireless data exchanging unit;

the short-range wireless data exchanging unit being mounted within the floating compartment;

the short-range wireless data exchanging unit being electrically connected to the battery through the power button; and the short-range wireless data exchanging unit being electronically connected to the chipset.

* * * * *